(12) United States Patent
Lin (10) Patent No.: US 11,474,298 B2
(45) Date of Patent: Oct. 18, 2022

(54) 2×2 OPTICAL UNITARY MATRIX MULTIPLIER

(71) Applicant: Intel Corporation, Santa Clara, CA (US)

(72) Inventor: Wenhua Lin, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/950,822

(22) Filed: Nov. 17, 2020

(65) Prior Publication Data
US 2021/0063645 A1   Mar. 4, 2021

(51) Int. Cl.
| | |
|---|---|
| *G02B 6/28* | (2006.01) |
| *G06N 3/04* | (2006.01) |
| *G06E 3/00* | (2006.01) |
| *H04B 10/2581* | (2013.01) |

(52) U.S. Cl.
CPC ........... *G02B 6/2813* (2013.01); *G06E 3/005* (2013.01); *G06E 3/008* (2013.01); *G06N 3/04* (2013.01); *H04B 10/2581* (2013.01)

(58) Field of Classification Search
None
See application file for complete search history.

(56) References Cited

U.S. PATENT DOCUMENTS

| | | | |
|---|---|---|---|
| 10,268,232 B2 | 4/2019 | Harris et al. | |
| 10,718,906 B2 | 7/2020 | Lin | |
| 2017/0351293 A1* | 12/2017 | Carolan | ............... G02F 1/3526 |
| 2019/0370652 A1 | 12/2019 | Shen et al. | |
| 2020/0110992 A1 | 4/2020 | Hosseinzadeh et al. | |
| 2021/0063645 A1* | 3/2021 | Lin | ............... H04B 10/2581 |
| 2021/0064958 A1* | 3/2021 | Lin | ............... G06E 1/045 |
| 2021/0097378 A1 | 4/2021 | Rodrigues et al. | |
| 2021/0133547 A1* | 5/2021 | Lin | ............... G06F 17/16 |

FOREIGN PATENT DOCUMENTS

| | | | | |
|---|---|---|---|---|
| CA | 2825540 A1 * | 8/2012 | ............. | G02B 6/126 |
| CN | 110703385 A * | 1/2020 | | |
| EP | 0933963 A2 * | 8/1999 | ......... | G02B 6/12011 |
| EP | 1030533 A1 * | 8/2000 | ......... | H04Q 11/0001 |

OTHER PUBLICATIONS

R. Jones et al., "Heterogeneously Integrated InP/Silicon Photonics", IEEE Nanotechnology Magazine, Apr. 2019, 10 pages.
Non-Final Office Action dated Apr. 13, 2021 for U.S. Appl. No. 16/950,819, 11 pages.

* cited by examiner

*Primary Examiner* — Jerry Rahll
(74) *Attorney, Agent, or Firm* — Schwabe, Williamson & Wyatt, P.C.

(57) ABSTRACT

Embodiments of the present disclosure are directed toward techniques and configurations for optical couplers comprising a first optical waveguide and a second optical waveguide coupled to form a 2×2 optical unitary matrix to receive a respective first input optical signal and a second input optical signal. In embodiments the first optical waveguide and second optical waveguide form arms that converge alongside each other to direct the first input optical signal and the second input optical signal along a path that integrates a plurality of tunable phase shifters to transform the first input optical signal or the second input optical signal into a first output optical signal and second output optical signal to be output from the 2×2 optical unitary matrix. Additional embodiments may be described and claimed.

22 Claims, 9 Drawing Sheets

2×2 OPTICAL UNITARY MATRIX MULTIPLIER

FIELD

Embodiments of the present disclosure generally relate to the field of optoelectronics, and more particularly, to techniques and configurations for a matrix multiplier for optical neural networks.

BACKGROUND

Machine learning architectures are typically based on artificial neural networks (ANNs). Optical neural networks (ONNs) are a type of ANN that use optical components as building blocks. The basic building blocks of an optical neural network (ONN) typically include interconnected Mach-Zehnder interferometers (MZI) that perform unitary transformations on an array of optical signals. Unfortunately, due to the size and configuration of MZIs, a network of interconnected MZIs may be less compact than desired.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure describe techniques and configurations for an optical device including a linear 2×2 optical unitary matrix multiplier. In embodiments, the 2×2 optical unitary matrix multiplier includes an optical coupler that is, for example, a 2×2 unitary directional optical coupler or a 2×2 unitary multi-mode interference (MMI) optical coupler. In embodiments, the 2×2 optical unitary matrix multiplier performs a 2×2 unitary linear transformation on optical signals and can serve as a building block for an optical neural network (ONN) in a machine learning apparatus. In embodiments, the optical coupler includes a first optical waveguide and a second optical waveguide coupled to receive a respective first input optical signal and a second input optical signal. In embodiments, the first optical waveguide and the second optical waveguide converge to run alongside each other to direct the first input optical signal and the second input optical signal along a path that integrates a plurality of tunable phase shifters to transform the first optical input signal and the second optical input signal. In embodiments, the 2×2 optical unitary matrix combines, splits, couples, and phase shifts optical signals to perform a linear transformation (e.g., matrix multiplication) to the optical input signals.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "optical waveguide" can refer to any physical device or structure that guides light (e.g., an optical signal) in a confined manner. In embodiments, the optical waveguides include silicon-based optical waveguides having a core for confinement of light and formation of modes surrounded by a cladding or substrate, having a lower refractive index than the core.

Figure 1:
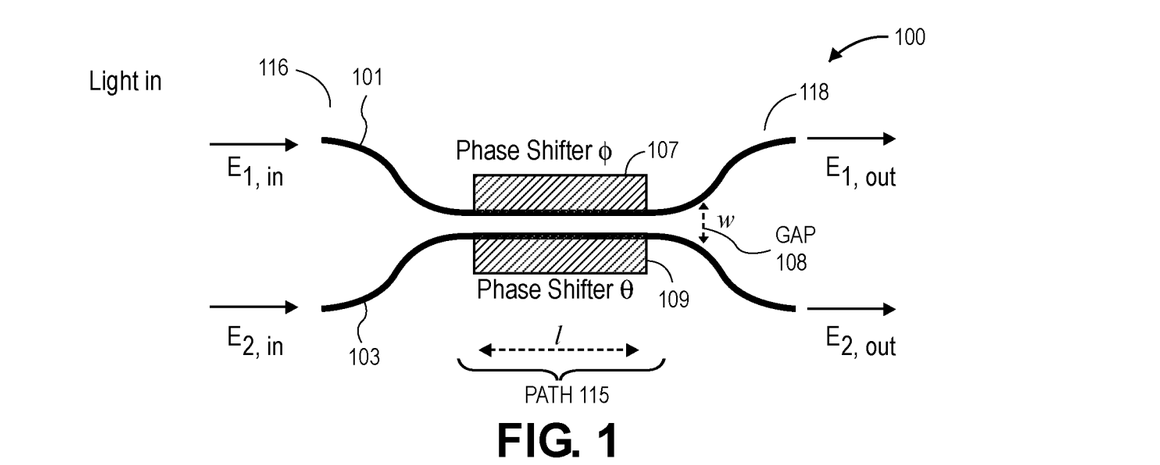
FIG. 1 illustrates an example top view of a 2×2 unitary directional optical coupler, in accordance with embodiments of the present disclosure.

FIG. 1 is illustrates an example top view of a 2×2 unitary directional optical coupler 100 (also referred to as "directional optical coupler 100"), in accordance with embodiments. In embodiments, a configuration of directional optical coupler 100 allows for a 2×2 optical unitary matrix multiplier that is able to perform a 2×2 unitary linear transformation on optical signals in a limited or compact space. As shown, directional optical coupler 100 includes a first optical waveguide 101 and a second optical waveguide 103. First optical waveguide 101 and second optical waveguide 103 are coupled to form a 2×2 optical unitary matrix to receive a respective first input optical signal (e.g., $E_{1,\,in}$) and a second input optical signal (e.g., $E_{2,\,in}$). As seen from FIG. 1, optical waveguide 101 and 103 form a respective first arm and a second arm that diverge at a first end (e.g., 116) and a second end (e.g., 118) and converge along a middle portion of a path (e.g., path 115). In embodiments, path 115 runs along first optical waveguide 101 and second optical waveguide 103 in a substantially parallel manner. In the embodiment, path 115 includes or integrates a plurality of phase shifters, (e.g., phase shifter 107 and phase shifter 109) to assist in transforming the first optical signal or the second optical signal into a first output optical signal (e.g., $E_{1\,out}$) and second output optical signal (e.g., $E_{2\,out}$) to be output from the 2×2 optical unitary matrix. In embodiments, the transformation includes a combining, splitting, and phase shifting of the first input optical signal and the second input optical signal.

As will be discussed further, in embodiments, phase shifters 107 and 109 include at least one of an electro-optical induced index modulator, thermal-optics induced index modulator, image-spot modulator, or opto-electronic-mechanical modulator, to allow for tunable power at output waveguides. In the embodiment shown, phase shifter 107 applies a first phase shift ø and phase shifter 109 applies a second phase shift θ. As noted previously, in embodiments, directional optical coupler 100 performs a linear unitary transformation via matrix multiplication to input optical signals $E_{1,in}$ and $E_{2,\,in}$. For example, the transfer matrix for the directional optical coupler of FIG. 1 can be expressed as:

$$U(2) = \begin{pmatrix} \cos(\theta - \phi) & i\sin(\theta - \phi) \\ i\sin(\theta - \phi) & \cos(\theta - \phi) \end{pmatrix}$$

Note that in embodiments, path 115 has a length of or includes a critical coupling length, l, to allow the unitary transformation of optical signals in optical waveguide 101 and 103. Thus, in the embodiment, 2×2 unitary directional optical coupler 100 includes phase shifters 107 and 109, which may also serve as optical splitters and optical combiners integrated along the critical coupling length l, to respectively split or combine the first input optical signal and/or second input optical signal. In embodiments, critical coupling length l is determined to be a length to, in combination with a width of gap 108, promote or allow the first optical signal to switch from first optical waveguide 101 to the second optical waveguide 103 or vice-versa. Thus, tuning of one or more of the phase shifters causes the first input optical signal or the second input optical signal (or a portion thereof) to be switched into either of the arms to effectively form an analog switch.

As noted above in FIG. 1, optical waveguide 101 and 103 form a respective first arm and a second arm that diverge at a first end (e.g., 116) and a second end (e.g., 118) and converge along a middle portion of a path (e.g., path 115). In embodiments, path 115 is a substantially parallel path along first optical waveguide 101 and second optical waveguide 103. Furthermore, note that path 115 includes a gap 108, having a width w, which runs between first optical waveguide 101 and second optical waveguide 103 along the substantially parallel path. In embodiments, the configuration of the 2×2 optical unitary matrix including the first arm and the second arm that converge to at least a critical coupling length l and gap 108 allow for the matrix multiplication to be performed in a limited or compact space.

Figure 2:
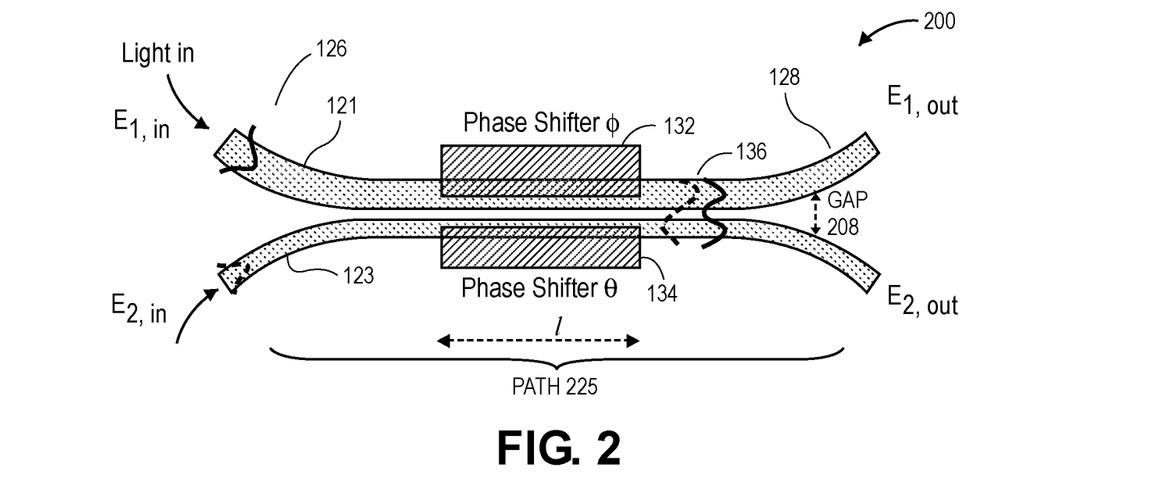
FIG. 2 illustrates an example top view of a 2×2 unitary adiabatic directional optical coupler, in accordance with embodiments of the present disclosure.

Referring now to the embodiment of FIG. 2, which illustrates an example top view of a 2×2 unitary adiabatic directional optical coupler 200 (also sometimes referred to as "adiabatic directional coupler"). In FIG. 2, adiabatic directional optical coupler 200 includes a first optical waveguide 121 and second optical waveguide 123 evanescently coupled to form a 2×2 optical unitary matrix. In embodiments, adiabatic directional optical coupler 200, however, is formed to operate without optical loss or substantially any optical loss. In the embodiments shown, adiabatic directional optical coupler 200 is formed to include optical waveguides that have dissimilar widths, core dimensions, or bend diameters, from each other and/or that vary in their widths or diameters along a length of an optical path that includes a plurality of phase shifters, e.g., phase shifter 132 and 134. In the embodiment, adiabatic directional optical coupler 200 receives a respective first input optical signal (e.g., $E_{1,in}$) and a second input optical signal (e.g., $E_{2,\,in}$) and outputs a respective first output optical signal (e.g., $E_{1\,out}$) and second output optical signal (e.g., $E_{2\,out}$). As shown, optical waveguide 121 and optical waveguide 123 converge to run alongside each other to direct the first input optical signal and the second input optical signal along optical path 225 ("path 225"). In embodiments, path 225 may include a critical coupling length, l, that may be longer or shorter than path 225, but that promotes adiabatic evanescent coupling between optical signals in optical waveguide 121 and 123.

As noted above and as shown in FIG. 2, first optical waveguide 121 has a different width, core dimension, or bend diameter, from second optical waveguide 123. Furthermore, in some embodiments, the width of one or more of first optical waveguide 121 and second optical waveguide 123 varies along path 225. Accordingly, adiabatic directional optical coupler 200 includes a first optical waveguide 121 separated from a second optical waveguide 123 by a gap 208. In embodiments, gap 208 varies in width along path 225 due to varying width of first optical waveguide 121 or second optical waveguide 123. In embodiments, gap 208 includes a width that in addition to a critical coupling length l, is determined to promote evanescent coupling (e.g., at 136) between a first input optical signal and second input optical in first optical waveguide 121 and second optical waveguide 123.

Figure 6A:
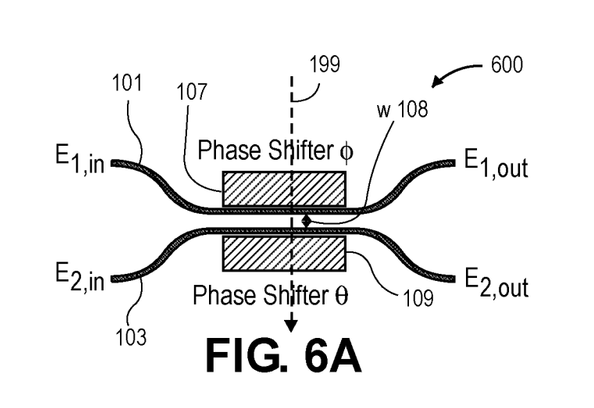
FIGS. 6A-6F illustrate top views and cross-sectional views of 2×2 unitary directional optical couplers, in accordance with embodiments of the present disclosure.

As seen in FIG. 2, optical waveguides 121 and 123 form a respective first arm and a second arm that diverge at a first end (e.g., 126) and a second end (e.g., 128) and converge along a middle portion of a substantially parallel path (e.g., path 225). Note optical waveguides 121 and 123 form a concave up or concave down shape. Note that as shown and discussed in connection with FIGS. 3 and 6 below, it is understood that a type and number of phase shifters in directional optical coupler 100 and adiabatic directional optical coupler 200 will vary.

Figure 3:
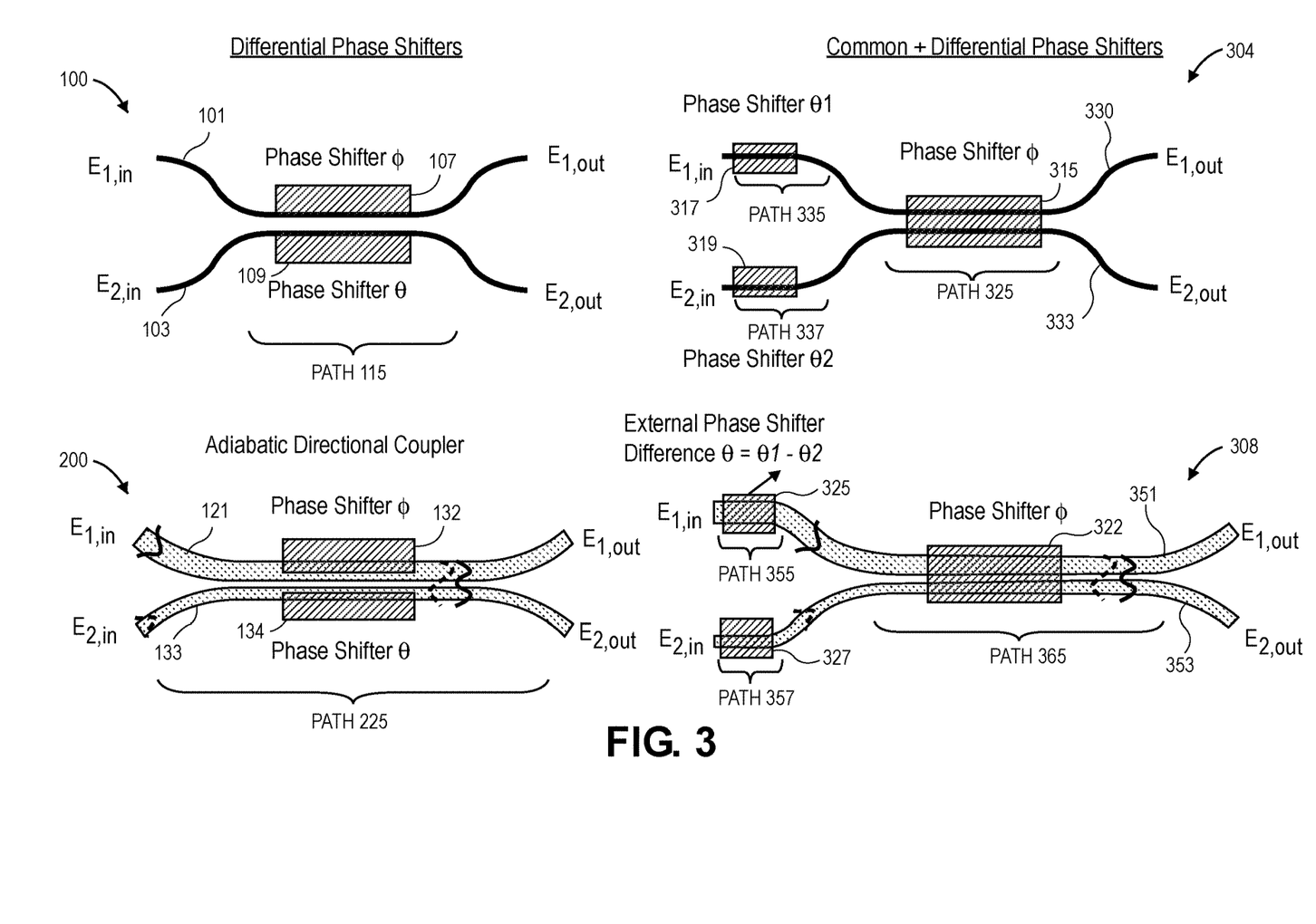
FIG. 3 illustrates an example top view of a plurality of 2×2 unitary directional optical couplers and adiabatic directional optical couplers including one or more common or differential phase shifters, in accordance with embodiments of the present disclosure.

FIG. 3 illustrates an example top view of a plurality of 2×2 unitary directional optical couplers and adiabatic directional optical couplers including one or more common or differential phase shifters, in accordance with embodiments. On a left side of FIG. 3, directional coupler 100 and adiabatic directional coupler 200 as described above in FIGS. 1 and 2 are reproduced. Note that directional coupler 100 and adiabatic directional coupler 200 include differential phase shifters. For example, unitary directional optical coupler 100 includes phase shifter 107, which applies a phase shift ø, and phase shifter 109, which applies a phase shift θ, to apply a differential phase shift (e.g., phase shift ø−phase shift θ). Similarly, adiabatic directional coupler 200 includes phase shifters 132 and phase shifter 134 to apply a differential phase shift (phase shift ø−phase shift θ) to a first input optical signal (e.g., $E_{1,in}$) and a second input optical signal (e.g., $E_{2,in}$) of adiabatic directional coupler 200.

In contrast, directional optical coupler 304 and adiabatic directional optical coupler 308 on a right side of FIG. 3 include both differential phase shifters and a common or single phase shifter that is common to both optical waveguides. As shown, directional optical coupler 304 includes a first optical waveguide 330 and a second optical waveguide 333. Common phase shifter 315 is located or integrated on a path common to each of first optical waveguide 330 and second optical waveguide 333. In contrast, external phase shifters 317 and 319 are located on paths 335 and 337 that are external to a path 325 that integrates common phase shifter 315, which implements a unitary transformation of the 2×2 unitary matrix. In the example embodiment, external phase shifters 317 and 319 of directional optical coupler 304 together apply a differential phase shift of phase shift θ1−phase shift θ2.

Similarly, in embodiments, adiabatic directional coupler 308 includes a first optical waveguide 351 and a second optical waveguide 353 including a common phase shifter 322. Common phase shifter 322 is located or integrated on a path common to each of first optical waveguide 351 and second optical waveguide 353. In contrast, external phase shifters 325 and 327 are located on paths 355 and 357 that are external to a path 365 that integrates common phase shifter 322, which implements a unitary transformation. In embodiments, external phase shifter 325 applies phase shift θ1 while external phase shifter 327 applies a phase shift of θ2 to together apply a differential phase shift of θ1−θ2.

Figure 4:
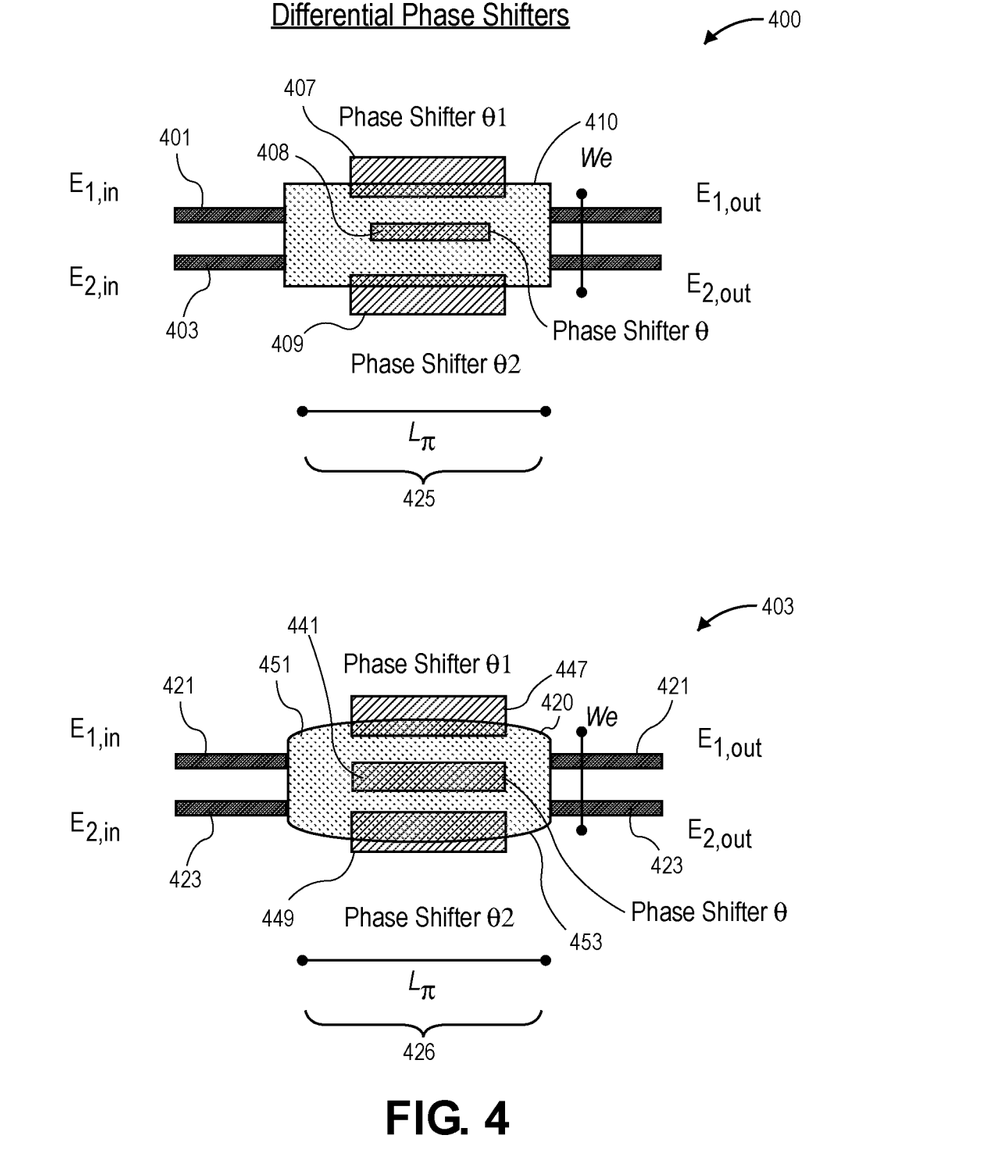
FIG. 4 illustrates a top view of two example 2×2 unitary multi-mode interference (MMI) optical couplers, in accordance with embodiments of the present disclosure.

Referring now to FIG. 4, which illustrates a top view of two example 2×2 unitary multi-mode interference (MMI) optical couplers, in accordance with embodiments. In FIG. 4, each of unitary MMI optical coupler 400 and a unitary MMI optical coupler 403 include respective multi-mode (MMI) waveguide structures 410 and 420 that intersect an optical path. In embodiments, the MMI waveguide structures are formed such that modes of a first optical signal and modes of a second optical signal interfere with each other to assist in performing a unitary transformation of input optical signals. Note that unitary MMI optical coupler 400 and unitary MMI optical coupler 403 are similar to each other, with the exception of a differing shape of a bowed shape of MMI waveguide structure 420 of unitary MMI optical coupler 403.

As shown, unitary MMI optical coupler 400 includes a first optical waveguide 401 and a second optical waveguide 403 coupled to form a 2×2 optical unitary matrix to receive a respective first input optical signal (e.g., $E_{1\ in}$) and a second input optical signal (e.g., $E_{2\ in}$). In embodiments, MMI waveguide structure 407 has a length Lπ and a width $W_e$. Optical waveguide 401 and optical waveguide 403 run alongside each other to direct the first input optical signal and the second input optical signal along an optical path 425 that intersects with MMI waveguide structure 410 for length Lπ. In the embodiment, optical path 425 includes or integrates a plurality of phase shifters to assist in performing a unitary transformation of the first optical signal and/or the second optical signal into a first output optical signal (e.g., $E_{1out}$) and second output optical signal (e.g., $E_{2\ out}$). In the embodiment, MMI optical coupler 400 includes phase shifter 407, phase shifter 408, and phase shifter 409 along length Lπ.

Similarly, unitary MMI optical coupler 403 includes a first optical waveguide 421 and a second optical waveguide 423 coupled to form a 2×2 optical unitary matrix to receive a respective first input optical signal (e.g., $E_{1\ in}$) and a second input optical signal (e.g., $E_{2\ in}$). In the embodiment, optical path 426 includes or integrates a plurality of phase shifters to assist in performing a unitary transformation of the first optical signal or the second optical signal into a first output optical signal (e.g., $E_{1out}$) and second output optical signal (e.g., $E_{2out}$) to be output from the 2×2 optical unitary matrix. In the embodiment, MMI optical coupler 403 includes phase shifter 447, phase shifter 441, and phase shifter 449 along length Lπ.

In embodiments, MMI waveguide structure 420 has a length Lπ and a width $W_e$. Optical waveguide 421 and optical waveguide 423 run alongside each other to direct the first input optical signal and the second input optical signal along an optical path 426 that intersects with MMI waveguide structure 420 for length Lπ. As noted above, MMI waveguide structure 420 has a differing shape than MMI waveguide structure 410. In the embodiment shown, MMI waveguide structure 420 has a curved or bowed shape along lengthwise perimeters 451 and 453. In embodiments, the curved or bowed shape provides additional space to allow interference of the modes of the first optical input signal and a second optical input signal.

Note that, in embodiments, length Lπ of MMI optical couplers 400 and 403 includes a fraction or a multiple of a critical beating length Lc of the two lowest order modes, with a multiple of a phase shifter combination for optimal phase shift efficiency. For example, if width $W_e$ is a width of MMI optical couplers 400 or 403, βo is the propagation foundation of the foundational mode, β1 is the propagation constant of a first order mode, $n_r$ is the effective refractive index of an optical waveguide, e.g., MMI waveguide structure 407 or 420, and λo is the wavelength of the light, then:

$$L_c = \frac{\pi}{\beta_0 - \beta_1} \approx \frac{4n_r W_e^2}{\beta_0 - \beta_1}$$

Note that, although MMI optical coupler 400 and 403 each include three phase shifters, it is understood that in other embodiments, the MMI optical couplers include any suitable number of phase shifters or arrangements of phase shifters to phase shift the first input optical signal and/or the second input optical signal to perform a unitary transformation. In some examples, MMI optical couplers includes successive phase shifters along the optical path that includes length Lπ. In some examples, the MMI optical couplers also include a combination of both common phase shifters and differential phase shifters as will be shown in FIG. 5. In embodiments, modes of the first optical signal and the second optical signal interfere in the MM waveguide to output an optical signal at a power ratio that can be adjusted according to unitary matrix algebra.

Figure 5:
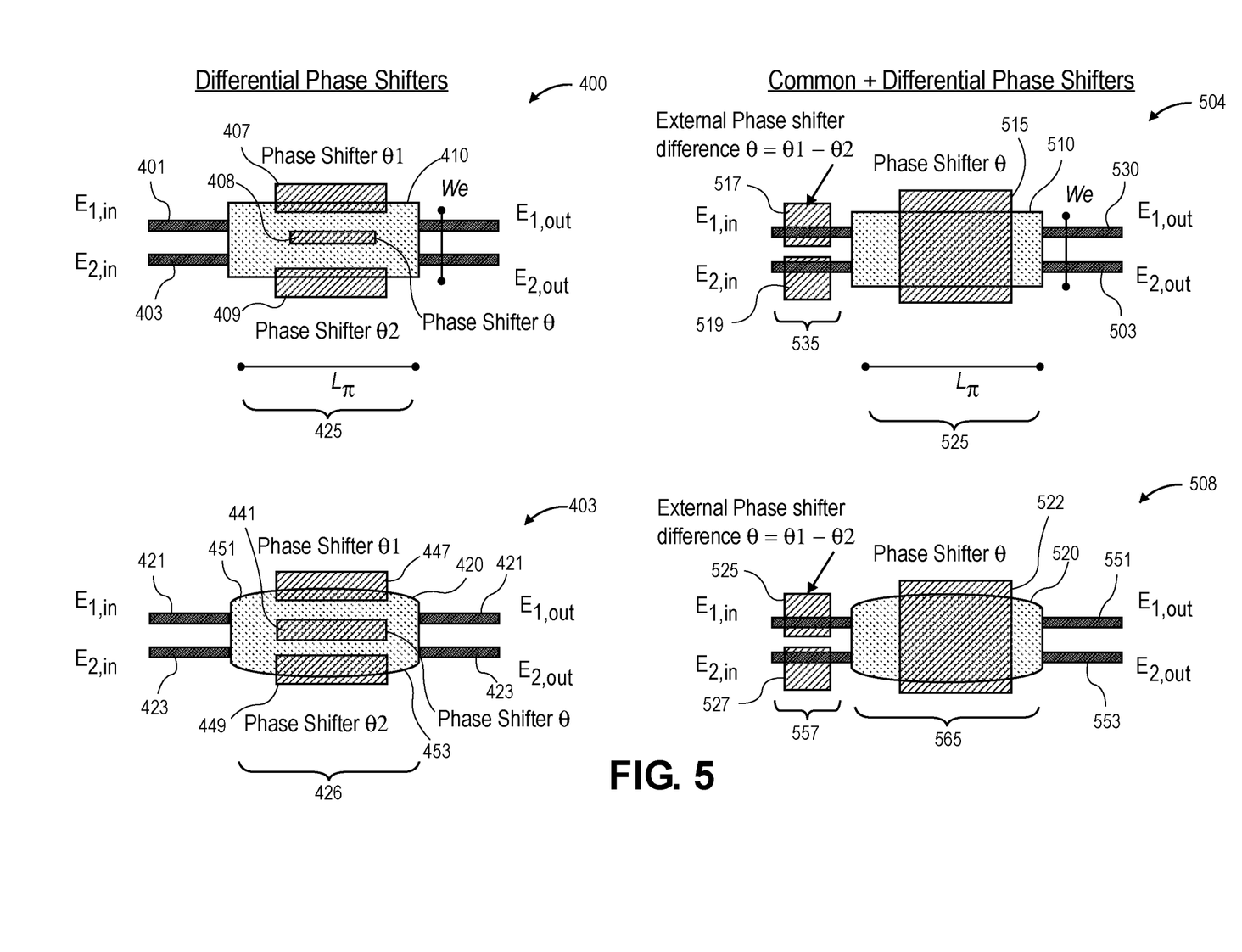
FIG. 5 illustrates a top view of example 2×2 unitary multi-mode interference (MMI) optical couplers, having one or more of differential phase shifters and/or common phase shifters, in accordance with embodiments of the present disclosure.

FIG. 5 illustrates a top view of example 2×2 unitary multi-mode interference (MMI) optical couplers, having differential phase shifters and/or common phase shifters. Unitary MMI optical couplers 400 and 403 of FIG. 4, whose elements were shown and described in connection with FIG. 4, are reproduced on a left column of FIG. 4. Thus, unitary MMI optical coupler 400 includes phase shifter 407 and phase shifter 409 to apply a differential phase shift (e.g., phase shift ø1–phase shift ø2). Similarly, MMI optical coupler 403, having curved MMI waveguide structure 420, includes phase shifters 447 and 449 to apply a differential phase shift (phase shift ø1–phase shift ø2) on its respective first optical waveguide and second optical waveguide. Each of MMI optical coupler 400 and 403 also include respective phase shifters 408 and 441 to apply a phase shift θ.

Unitary MMI optical couplers 504 and 508 on a right side of FIG. 5 include elements similar to or the same as unitary MMI optical couplers 400 and 403. In contrast to unitary MMI optical couplers 400 and 403, however, unitary MMI optical couplers 504 and 508 have differential phase shifters located external to their respective waveguide structures 510 and 520. In embodiments, the differential phase shifters are located or integrated on an external path (e.g., 535 and 557) optically coupled to the respective 2×2 unitary matrices. Unitary MMI optical couplers 504 and 508 each include a common phase shifter integrated within or on waveguide structures 510 and 520. In embodiments, common phase shifters 515 and 522 are located in or integrated on substantially an entire optical path along respective waveguide structures 510 and 520. In contrast, external phase shifters (517, 519 and 525, 527) are located on paths 535 and 537 that are external to optical paths 525 and 565 of respective waveguide structures 510 and 520. Note that, in embodiments, due to having both common and differential phase shifters, unitary directional optical coupler 100 may be tuned with differential and common phase control modes.

Figure 6B:
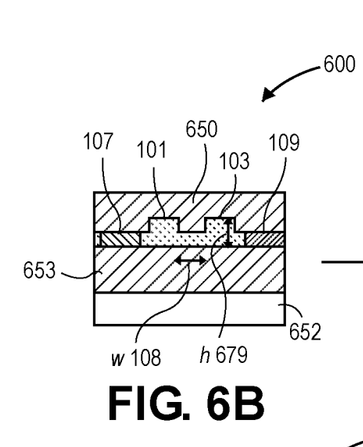
Figure 6C:
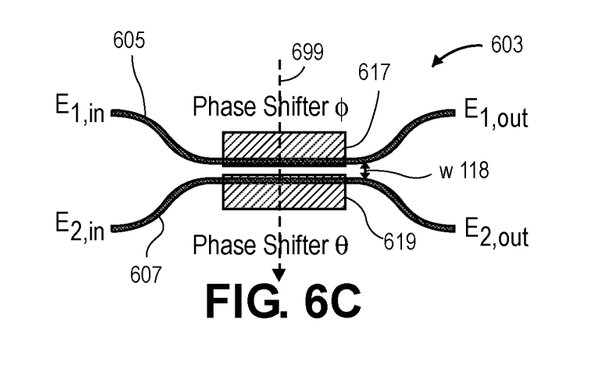
Figure 6D:
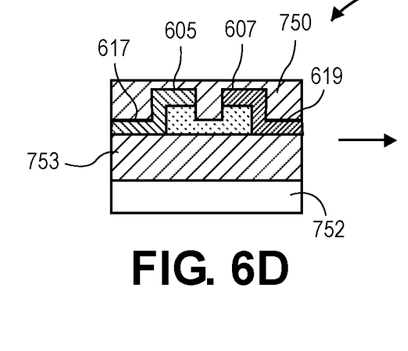
Figure 6E:
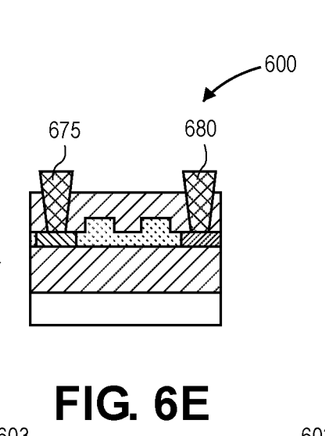
Figure 6F:
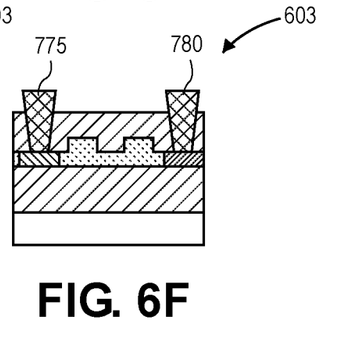
Figure 7A:
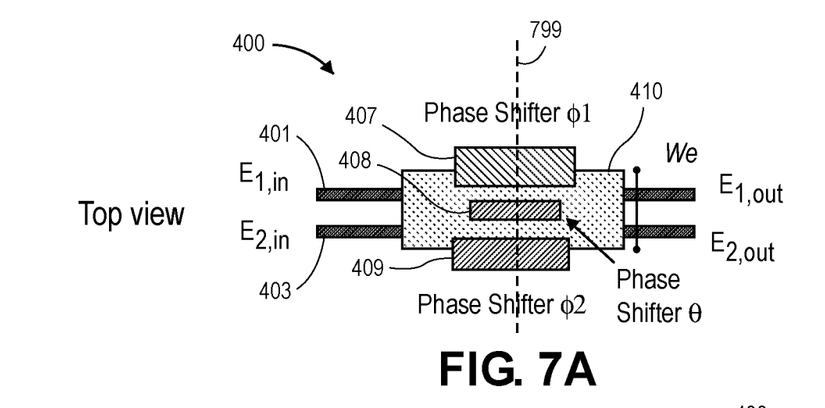
FIGS. 7A-7C illustrate top views and cross-sectional views of a 2×2 unitary MMI optical coupler, in accordance with embodiments of the present disclosure.
Figure 7B:
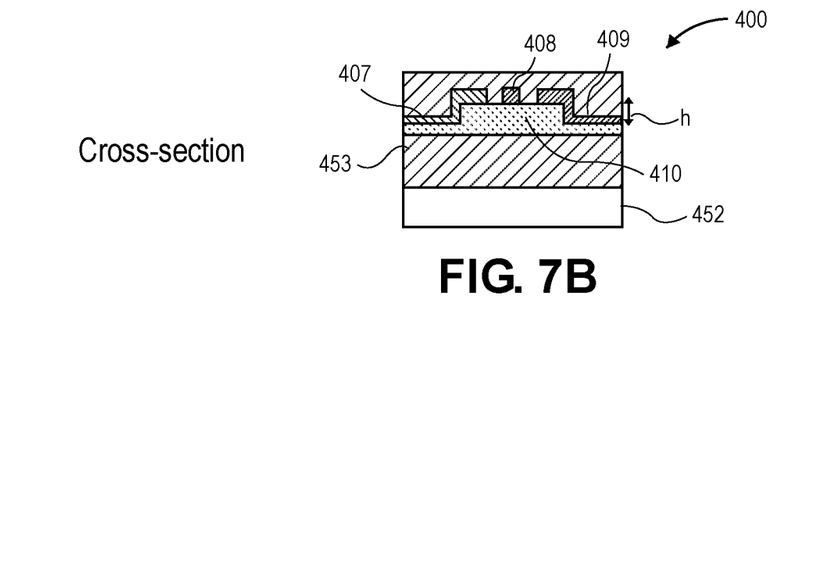
Figure 7C:
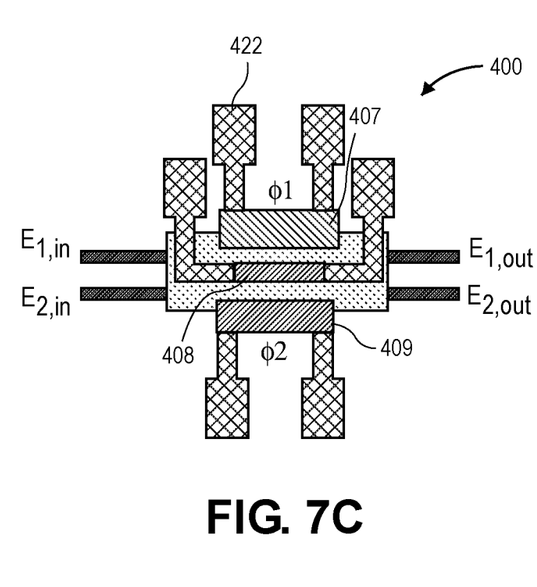
Figure 8A:
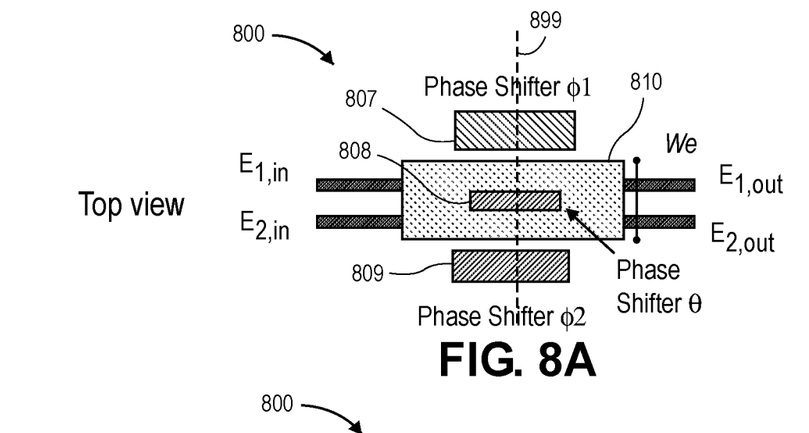
FIGS. 8A-8C illustrate top views and cross-sectional views of a 2×2 unitary MMI optical coupler, in accordance with another embodiment of the present disclosure.
Figure 8B:
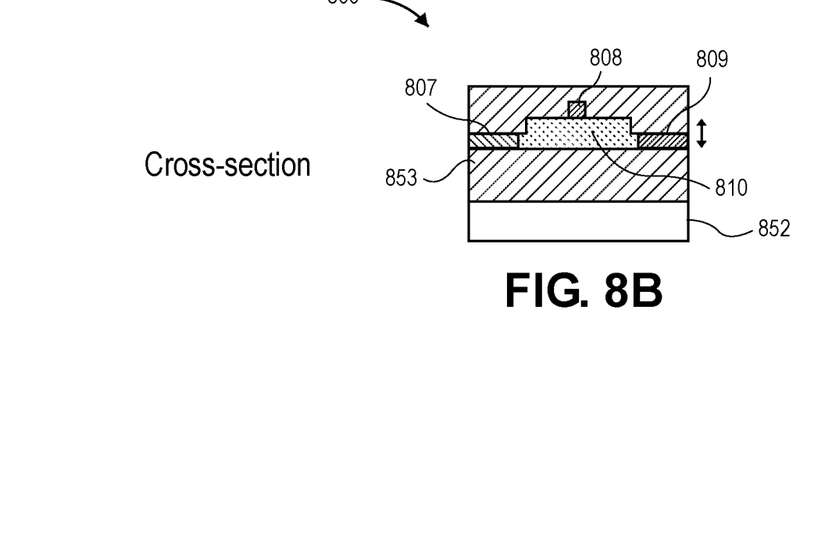
Figure 8C:
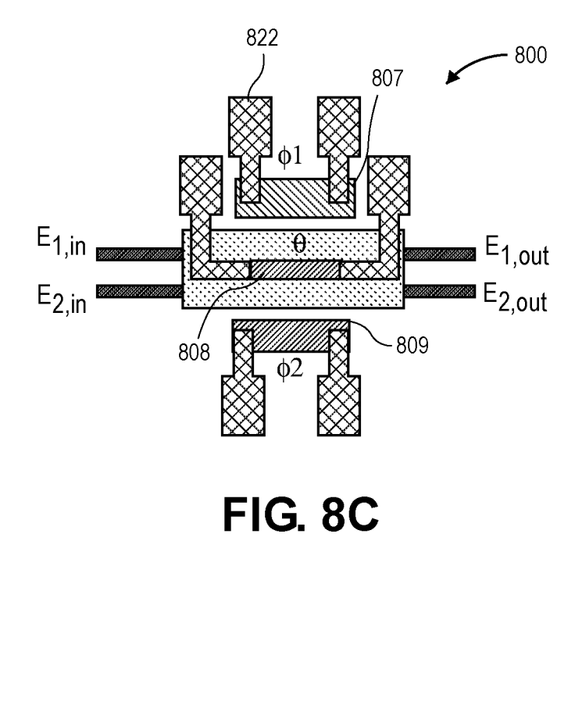

FIGS. 6-8 illustrate top and cross-sectional views of various embodiments of example 2×2 unitary directional optical couplers and 2×2 unitary MMI optical couplers. Note that in embodiments, the optical couplers are formed in crystalline silicon. Examples of waveguide materials include but are not limited to silicon, a thin silicon layer in SOI (silicon on insulator), glass, oxides, nitrides, e.g., silicon nitride, polymers, semiconductors or other suitable materials. In embodiments, waveguides in the optical couplers described in the FIGS. may be made of any medium that propagates a wavelength of light and surrounded with a cladding with a lower index of refraction. In some embodiments, waveguides may be formed on a buried oxide layer (BOX) layer of an SOI wafer with a top cladding layer over the waveguides. In embodiments, the top cladding layer includes silicon dioxide ($SiO_2$) having an index of refraction of n=1.45, while a silicon-based waveguide has an index of refraction of, e.g., n=3.48. In embodiments, the optical couplers are formed via known lithography/etch methods associated with formation of optical waveguides on SOI wafers.

FIGS. 6A-6F illustrate top and cross-sectional views of example 2×2 unitary directional optical couplers, in accordance with embodiments of the present disclosure. FIG. 6A illustrates unitary directional optical coupler 600 which is the same or similar as unitary directional optical coupler 100 shown and described in FIG. 1 (for brevity, description of some similar elements are not repeated). In embodiments, a dotted arrow 199 represents a plane through which a cross-section of unitary directional optical coupler 600 is shown in FIG. 6B. As shown, in FIG. 6B, first optical waveguide 101 and second optical waveguide 103 are single mode optical waveguide structures formed over a buried oxide layer (BOX) 653 on a silicon on insulator (SOI) wafer 652. In the embodiment, a top cladding layer 650 is formed over first optical waveguide 101 and second optical waveguide 103. In the embodiment, phase shifter 107 and phase shifter 109 are formed to abut or nearly abut respective first optical waveguide 101 and second optical waveguide 103 but do not cover first optical waveguide 101 and second optical waveguide 103. In embodiments, an example width w of a gap 108 between waveguides 101 and 103 is 0.2-0.8 micrometers (μm). In the example of FIG. 6A, first optical waveguide 101 and second optical waveguide 103 have heights of 0.2-0.4 μm (e.g., element 679 in FIG. 6B). Note that these widths and heights are only examples and any suitable heights or widths that are consistent with providing 2×2 unitary directional optical couplers with phase shifters to perform the unitary transformation are contemplated.

In some embodiments, after formation of phase shifters 107 and 109, metal connections to control a tuning of the phase shifters using known methods are implemented. For example, various method include, but are not limited to, processes that include, e.g., resistive thin-film strip (doped silicon, SiN) or metal wire (TiW, Tungsten) as thermal phase shifters, or doped P+ regions and doped N+ regions to form p-i-n junctions as electro-optical phase shifters. For example, FIG. 6E illustrates unitary directional optical coupler 600 after metal connections 675 and 680 are formed (note that similar or same elements have not been labeled for clarity in the FIGS), using known methods such as passivation layer (typical oxide layer, SiN) deposition, and pad openings for metal contacts and connections 675 and 680. In various embodiments, metal connections 675 and 680 may include wire bonding, bump pads, or other suitable connections, coupled to allow a tunability of phase shifters 107 and 109. In embodiments, electro-optic tuning of phase shifters 107 and 109 control application of weights being applied in matrix multiplication in the unitary transformation.

In an embodiment, shown in FIG. 6C, is another unitary directional optical coupler 603. As shown, unitary directional optical coupler 603 includes a phase shifter 617 and phase shifter 619 that cover at least a top portion of first optical waveguide and a second optical waveguide 605 and 607. In embodiments, a dotted arrow 699 represents a plane through which a cross-section of unitary directional optical coupler 603 is shown to the right of optical coupler 603 in FIG. 6D. As shown, phase shifters 617 and 619 are formed over a buried oxide layer (BOX) 753 over a silicon on insulator (SOI) wafer 752. A top cladding layer 750 is shown above phase shifters 617 and 619. As noted above, phase shifters 617 and 619 are formed to cover at least a portion of respective first optical waveguide 605 and second optical waveguide 607.

After formation of phase shifters 617 and 619, metal connections to control a tuning of the phase shifters are formed. For example, FIG. 6F illustrates unitary directional optical coupler 603 after metal connections 775 and 780 are formed (note that similar or same elements have not been labeled for clarity in the FIGS). In various embodiments, metal connections 775 and 780 may include wire bonding, bump pads, or other suitable connections, to allow a tunability of phase shifters 617 and 619.

In embodiments, phase shifter 107 and phase shifter 109 of FIG. 6A are PN—diode—based phase shifters or thermal based phase shifters. Note that in other embodiments, phase shifters 617 and 619 of FIG. 6C may cover varying portions of first optical waveguide 605 and second optical waveguide 607.

FIGS. 7A-7C illustrate top and cross-sectional views of a 2×2 unitary MMI optical coupler, in accordance with embodiments of the present disclosure. FIGS. 7A-7C illustrate embodiments associated with methods of forming phase shifters of a unitary MMI optical coupler. FIG. 7A illustrates a unitary MMI optical coupler similar to as shown and described in FIG. 4 (note that description of similar elements may not be repeated). In embodiments a dotted arrow 799 represents a plane through which a cross-section of unitary MMI optical coupler 400 is shown in FIG. 7B. As seen in FIG. 7B, unitary MMI optical coupler 400 is formed over a buried oxide layer (BOX) 453 on a silicon on insulator (SOI) wafer 452. In embodiments, phase shifters 407 and 409 are formed to cover at least a portion of MMI waveguide structure 410. In some embodiments, MMI waveguide structure 410 is a waveguide that is wide compared to, e.g., first optical waveguide 401 and second optical waveguide 403, and includes a width $W_e$ of, for example, 2-10 µm and a height h of 0.2-0.4 µm. In the embodiment, additional phase shifter 408 is formed over (or integrated above) MMI waveguide structure 410. After formation of the phase shifters, metal connections to control a tuning of the phase shifters are formed. For example, FIG. 7C illustrates MMI optical coupler 400 after metal connections 422 are formed. In various embodiments, metal connections 422 may include wire bonding or bump pads coupled to tunable phase shifters of MMI optical coupler 400. Although six metal connections are shown, only metal connection 422 is labeled for clarity in the FIGS.

Note that an electro-optical tuning applied through the metal connections allows the modes of the first optical signal and the second optical signal to interfere in the MM waveguide to output an optical signal at a power ratio that can be adjusted according to U(2) matrix algebra.

FIGS. 8A-8C illustrate top views and cross-sectional views of another 2×2 unitary MMI optical coupler, in accordance with another embodiment of the present disclosure. FIGS. 8A-8C are associated with a method of forming phase shifters in a unitary MMI optical coupler. FIG. 8A shows a top view of a unitary MMI optical coupler similar to that of FIGS. 7A-7C and FIG. 4, with the exception that a first and a second phase shifter are formed next to MMI waveguide structure 810 (rather than covering a portion of MMI waveguide structure 810). In FIG. 8A, a dotted arrow 899 represents a plane through which a cross-section of a unitary MMI optical coupler 800 is shown in FIG. 8B. As seen in FIG. 8B, unitary MMI optical coupler 800 is formed over a buried oxide layer (BOX) 853 on a silicon on insulator (SOI) wafer 852. In embodiments, phase shifters 807 and 809 are formed next to MMI waveguide structure 810. In the embodiment shown, a third, or additional, phase shifter 808 is formed over (or integrated above) MMI waveguide structure 810.

After formation of the phase shifters, metal connections to control a tuning of the phase shifters 807 and 809 are formed. For example, FIG. 8C illustrates unitary MMI optical coupler 800 after metal connections 822 are formed. In various embodiments, metal connections 822 may include wire bonding or bump pads coupled to tunable phase shifters 807, 808, and 809 of MMI optical coupler 800. Although six metal connections are shown, only metal connection 822 is labeled for clarity in the FIGS.

Note that phase shifters 407, 409 and 807, 808, and 809 of FIGS. 7A and 8A may include any suitable type of phase shifter such as, but not limited to, PN-junction diode phase shifters or thermal heater phase shifters. Furthermore, as noted previously, a number and configuration of phase shifters may vary. For example, in various embodiments, a plurality of phase shifters may be integrated on MMI waveguide structure 410 or 810 in a successive arrangement (not shown).

Thus, in embodiments, as shown and discussed in connection with FIGS. 6-8, forming an optical coupler includes disposing a first optical waveguide alongside a second optical waveguide in a semiconductor layer and forming a plurality of tunable phase shifters along a path formed by the first optical waveguide and the second optical waveguide. In embodiments, the first optical waveguide and the second optical waveguide are disposed to run along the path to form a 2×2 unitary matrix that receives a first optical signal at the first optical waveguide and a second optical signal at the second optical waveguide. The waveguides are to direct the first optical signal and a second optical signal along the path to output a phase-shifted optical signal from the first optical waveguide and the second optical waveguide.

Figure 9:
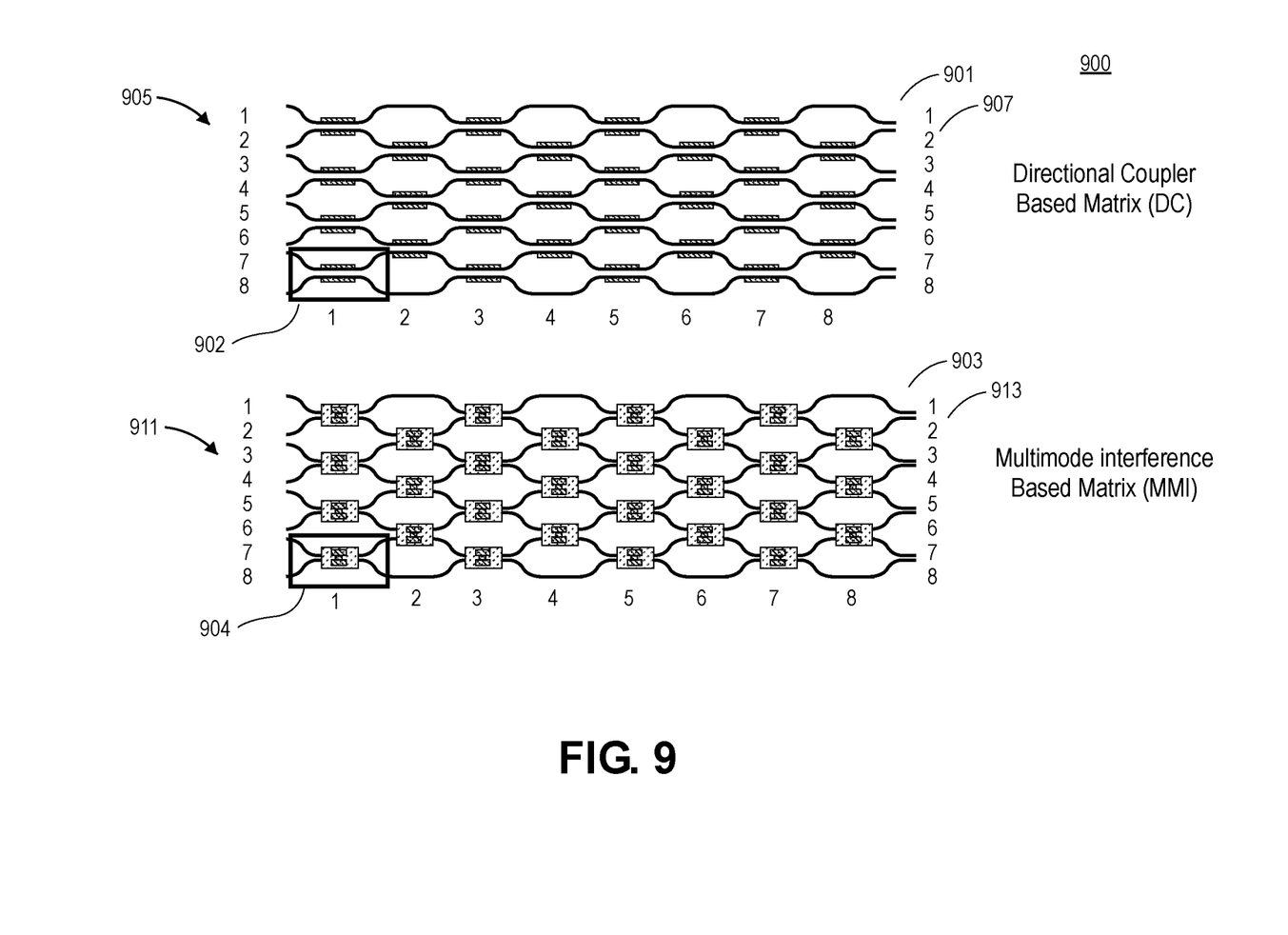
FIG. 9 illustrates a matrix multiplier that includes a plurality of 2×2 unitary directional optical matrices and an optical unitary matrix that includes a plurality of 2×2 unitary multi-mode interference (MMI) optical couplers, in accordance with other embodiments of the present disclosure.

FIG. 9 illustrates examples of a first matrix multiplier and a second matrix multiplier having a plurality of optical unitary matrices coupled together. In embodiments, the unitary optical matrices are coupled together to form matrix multipliers having a plurality of n optical inputs and a plurality of n optical outputs. In embodiments, the plurality of 2×2 unitary optical matrices are optically coupled to receive an array of optical signal inputs and to linearly transform the plurality of optical signal inputs into an array of optical signal outputs, wherein each of the plurality of 2×2 unitary optical matrices include a first optical waveguide and a second optical waveguide coupled to converge and diverge along an optical path.

In embodiments, matrix multiplier 901 is a larger unitary optical matrix that includes a plurality of 2×2 unitary directional optical matrices 902 (e.g., similar or the same as directional optical coupler 100 of FIG. 1), while matrix multiplier 903 includes a plurality of 2×2 unitary multimode interference (MMI) optical couplers 904 (e.g., similar or the same as the example 2×2 unitary (MMI) optical couplers of FIG. 4). Note that for clarity in the FIG., only one of 2×2 directional optical matrices 902 (e.g., 2×2 directional optical coupler 100 of FIG. 1) and one of 2×2 unitary MMI optical couplers 904 is labeled. For matrix multiplier 901, a plurality of 2×2 directional optical matrices 902 are optically coupled together to receive an array of optical signal inputs at 905 in FIG. 8 and to linearly transform the plurality of optical signal inputs into an array of optical signal outputs 907. Similarly, for matrix multiplier 903, a plurality of unitary MMI optical couplers 904 are coupled together to receive an array of optical signal inputs at 911 to linearly transform the plurality of optical signal inputs into an array of optical signal outputs 913.

Note that in various embodiments, the matrix multipliers include any of, or any suitable combination of, different types of 2×2 optical matrices, such as the 2×2 unitary directional optical couplers and 2×2 unitary MMI optical couplers as described and shown in previous FIGS. 1-8. For example, in various embodiments, the matrix multipliers include a plurality of 2×2 unitary adiabatic directional optical couplers such as the 2×2 unitary adiabatic directional optical coupler of FIG. 2, 2×2 unitary directional optical couplers and adiabatic directional optical couplers having one or more common or differential phase shifters of FIG. 3, or 2×2 unitary multi-mode interference (MMI) optical couplers having one or more of differential phase shifters and/or common phase shifters of FIG. 5.

Note that the array of optical signal inputs 905 for matrix multiplier 901 (and optical signal inputs 911 for matrix multiplier 903) include n optical inputs and n optical signal outputs where n=8. In embodiments, the matrix multipliers each include n (n−1)/2 2×2 unitary optical matrices (e.g., n (n−1)/2 2×2 optical matrices). Although n=8 in FIG. 9 for both matrix multiplier 901 and 903, it should be understood that 8 is only an example and n is any number of optical inputs and optical outputs suitable for an application. In embodiments, n is 2, 4, 8, 16, 32, 64, 128, or 256. It is further understood that couplings as in matrix multiplier 901 and 903 have been simplified in order to conceptually illustrate optical connections between 2×2 directional optical matrices 902 or unitary multi-mode interference (MMI) optical couplers 904. The matrix multiplier can have n optical inputs and m output outputs, n may be not equal to m where n, m=2, 3, 8, 16, 32, 64, 128 or 256, and the matrix multiplier includes n (m−1)/2 2×2 unitary optical matrices.

Accordingly, as described in connection with FIGS. 2-8, each of 2×2 directional optical matrices 902 and 2×2 unitary multi-mode interference (MMI) optical couplers 904 each include a first optical waveguide and a second optical waveguide coupled along an optical path. Furthermore, for the embodiments, a plurality of tunable optical phase shifters (e.g., as described in connection with FIGS. 1-8) are included along the optical path of each of the first optical waveguide and the second optical waveguide in each of the plurality of 2×2 unitary optical matrices to phase shift an optical beam to linearly transform the array of optical signal inputs into the array of optical signal outputs. Accordingly, the 2×2 optical unitary matrix multipliers have a compact 2×2 structure that combine splitting, combining, and phase shifting in one device (in contrast to conventional solutions such as MZI). The unique structure including the convergence and divergence of the waveguides that alongside each other along the path to integrate tunable phase shifters enables a large matrix size (as shown with respect to FIG. 9) within a smaller footprint. Such a configuration further reduces power consumption due to the efficiency of the phase shifters. Conventional methods that use MZIs are further limiting due to large die size.

Figure 10:
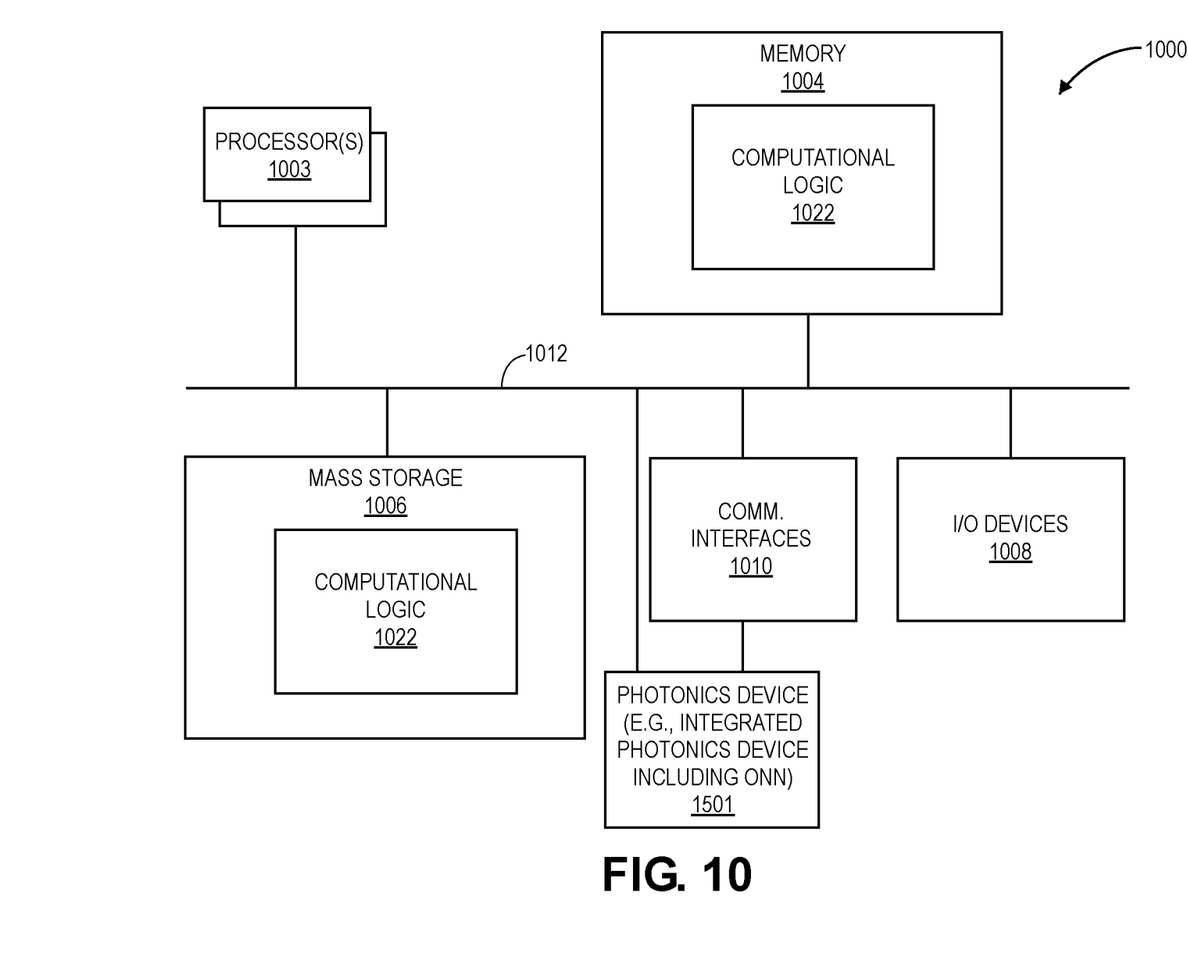
FIG. 10 illustrates a computing device, in accordance with other embodiments of the present disclosure.

FIG. 10 illustrates an example computing device 1000 suitable for use with an an optical unitary matrix multiplier such as described above in connection with FIG. 9 and including e.g., a plurality of 2×2 unitary directional optical matrices (e.g., directional optical couplers) and/or a plurality of 2×2 unitary multi-mode interference (MMI) optical couplers as described in connection with FIGS. 1-9. In some embodiments, a photonics device 1501 includes an integrated photonics device such as a photonics integrated circuit (photonics IC) having an ONN that includes an optical unitary matrix multiplier. In embodiments, a processor coupled to the photonics IC provides the ONN with the data to modulate onto the array of optical signal inputs to be transformed by the optical unitary matrix multiplier.

In embodiments, the photonics device 1501 may include (or be used) in general matrix multiplier (GEMM) or convolutional (CONV) neural network accelerators, heterogeneous artificial intelligence (AI) media inferencing accelerators, domain-specific machine-learning and deep learning accelerators (Neuro/Memory/inferencing/training), or data-centric neural network computing processors.

For example, as shown, computing device 1000 may include a one or more processors or processor cores 1003 and memory 1004. In some embodiments, the device 1001 may be integrated with the processors 1003. In embodiments, memory 1004 may be system memory. For the purpose of this application, including the claims, the terms "processor" and "processor cores" may be considered synonymous, unless the context clearly requires otherwise. The processor 1003 may be a high-performance processor and/or include any type of processors, such as a central processing unit, a microprocessor, and the like. The processor 1003 may be implemented as an integrated circuit having multi-cores, e.g., a multi-core microprocessor. The computing device 1000 may include mass storage devices 1006 (such as diskette, hard drive, volatile memory (e.g., dynamic random-access memory (DRAM), compact disc read-only memory (CD-ROM), digital versatile disk (DVD), and so forth). In general, memory 1004 and/or mass storage devices 1006 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 1000 may further include input/output (I/O) devices 1008 (such as a display (e.g., a touchscreen display), keyboard, cursor control, remote control, gaming controller, image capture device, and so forth) and communication interfaces 1010 (such as network interface cards, modems, infrared receivers, radio receivers (e.g., Bluetooth), and so forth). In some embodiments, the communication interfaces 1010 may include or otherwise be coupled with integrated photonics device 1001, as described above, in accordance with various embodiments.

The communication interfaces 1010 may include communication chips that may be configured to operate the device 1000 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1010 may operate in accordance with other wireless protocols in other embodiments.

The above-described computing device 1000 elements may be coupled to each other via system bus 1012, which may represent one or more buses. In the case of multiple buses, they may be bridged by one or more bus bridges (not shown). Each of these elements may perform its conventional functions known in the art. In particular, memory 1004 and mass storage devices 1006 may be employed to store a working copy and a permanent copy of the programming instructions for the operation of integrated photonics device. The various elements may be implemented by assembler instructions supported by processor(s) 1003 or high-level languages that may be compiled into such instructions.

The permanent copy of the programming instructions may be placed into mass storage devices 1006 in the factory, or in the field through for example, a distribution medium (not shown), such as a compact disc (CD), or through communication interface 1010 (from a distribution server (not shown)). That is, one or more distribution media having an implementation of the agent program may be employed to distribute the agent and to program various computing devices.

The number, capability, and/or capacity of the elements 1008, 1010, 1012 may vary, depending on whether computing device 1000 is used as a stationary computing device, such as a server computer in a data center, or a mobile computing device, such as a tablet computing device, laptop computer, game console, or smartphone. Their constitutions are otherwise known, and accordingly will not be further described.

For one embodiment, at least one of processors 1003 may be packaged together with computational logic 1022 configured to practice aspects of optical signal transmission and receipt described herein to form a System in Package (SiP) or a System on Chip (SoC).

In various implementations, the computing device 1000 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1000 may be any other electronic device that processes data.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

According to various embodiments, the present disclosure describes a number of examples.

Example 1 includes an optical coupler comprising: a first optical waveguide; and a second optical waveguide, wherein the first optical waveguide and the second optical waveguide are coupled to form a 2×2 optical unitary matrix to receive a respective first input optical signal and a second input optical signal, and converge to run alongside each other to direct the first input optical signal and the second input optical signal along a path that integrates a plurality of tunable phase shifters to transform the first input optical signal or the second input optical signal into a first output optical signal and second output optical signal to be output from the 2×2 optical unitary matrix.

Example 2 includes the optical coupler of Example 1, wherein the optical coupler is a 2×2 unitary directional optical coupler or a 2×2 unitary multi-mode interference (MMI) optical coupler.

Example 3 includes the optical coupler of Example 1, wherein the plurality of tunable phase shifters include at least one of an electro-optical induced index modulator, thermal-optics induced index modulator, an image-spot modulator, or opto-electro-mechanical modulator.

Example 4 includes the optical coupler of Example 1, wherein the optical coupler is a 2×2 unitary directional optical coupler and further includes an optical splitter and optical combiner integrated along the path to respectively split or combine the first input optical signal and/or the second input optical signal.

Example 5 includes the optical coupler of Example 1, wherein the first optical waveguide and the second optical waveguide include respective first and second tunable phase shifters located along a substantially parallel path.

Example 6 includes the optical coupler of Example 5, wherein the optical coupler comprises a 2×2 unitary directional optical coupler and the first optical waveguide and the second optical waveguide form a respective first arm and a second arm that diverge at a first end and a second end and converge along a middle portion of the substantially parallel path.

Example 7 includes the optical coupler of any one of Examples 1-6, wherein the plurality of phase shifters include at least one of a common phase shifter and a differential phase shifter.

Example 8 includes the optical coupler of Example 1, wherein the optical coupler comprises a 2×2 unitary directional optical coupler and includes an adiabatic directional coupler having a first optical waveguide that has a different width from the second optical waveguide.

Example 9 includes the optical coupler of Example 1, wherein the optical coupler is an MMI coupler and the path runs through a multi-mode waveguide structure to form a 2×2 optical coupler.

Example 10 includes a method of forming an optical coupler, comprising: disposing a first optical waveguide alongside a second optical waveguide in a semiconductor layer; and forming a plurality of tunable phase shifters along a path formed by the first optical waveguide and the second optical waveguide, wherein the first optical waveguide and the second optical waveguide are disposed to run along the path to form a 2×2 unitary matrix that receives a first optical signal at the first optical waveguide and a second optical signal at the second optical waveguide and direct the first optical signal and a second optical signal along the path to output a phase-shifted optical signal from the first optical waveguide and the second optical waveguide.

Example 11 includes the method of Example 10, wherein disposing the first optical waveguide alongside the second optical waveguide comprises disposing the first optical waveguide and the second optical waveguide in the semiconductor layer to include a gap that runs between the first optical waveguide and the second optical waveguide along a substantially parallel path.

Example 12 includes the method of Example 11, wherein the optical coupler is a 2×2 unitary directional optical coupler and the gap comprises a distance to promote evanescent coupling between the first optical waveguide and the second optical waveguide.

Example 13 includes the method of Example 10, wherein forming the plurality of tunable phase shifters includes forming a first phase shifter on the first optical waveguide and forming a second phase shifter on the second optical waveguide.

Example 14 includes the method of Example 10, wherein forming the plurality of tunable phase shifters includes forming a plurality of phase shifters in succession across the first and the second optical waveguide.

Example 15 includes the method of Example 10, wherein forming the plurality of tunable phase shifters includes forming a plurality of phase shifters including at least one of a thermal-based phase shifter and a PN-diode-based phase shifter.

Example 16 includes an optical unitary matrix multiplier, comprising: a plurality of 2×2 unitary optical matrices optically coupled to receive an array of optical signal inputs and to linearly transform the plurality of optical signal inputs into an array of optical signal outputs, wherein each of the plurality of 2×2 unitary optical matrices include a first optical waveguide and a second optical waveguide coupled to converge and diverge along an optical path; and a plurality of tunable optical phase shifters included along the optical path of each of the first optical waveguide and the second optical waveguide in each of the plurality of 2×2 unitary optical matrices to phase shift an optical beam to linearly transform the array of optical signal inputs into the array of optical signal outputs.

Example 17 includes the optical unitary matrix multiplier of Example 16, wherein the array of optical signal inputs includes an array of n optical signal inputs and the array of optical signal outputs includes an array of n optical signal outputs and wherein the optical unitary matrix multiplier includes n(n−1)/2 2×2 unitary optical matrices.

Example 18 includes the optical unitary matrix multiplier of Example 16, wherein each of the plurality of 2×2 unitary optical matrices is a 2×2 unitary directional optical coupler or a 2×2 unitary multi-mode interference (MMI) optical coupler.

Example 19 includes the optical unitary matrix multiplier of Example 16, wherein the plurality of 2×2 unitary optical matrices are coupled to split, combine, and phase shift one or more optical signals received by each of the plurality of 2×2 unitary optical matrices.

Example 20 includes the optical unitary matrix multiplier of any one of Examples 16-19, wherein n is 2, 4, 8, 16, 32, 64, 128, or 256.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

The invention claimed is:

1. An optical coupler comprising:
a first optical waveguide; and
a second optical waveguide, wherein the first optical waveguide and the second optical waveguide are coupled to form a 2×2 optical unitary matrix to receive a respective first input optical signal and a second input optical signal, and converge to run alongside each other to direct the first input optical signal and the second input optical signal along a path that integrates a plurality of tunable phase shifters to transform the first input optical signal or the second input optical signal into a first output optical signal and second output optical signal to be output from the 2×2 optical unitary matrix.

2. The optical coupler of claim 1, wherein the optical coupler is a 2×2 unitary directional optical coupler or a 2×2 unitary multi-mode interference (MMI) optical coupler.

3. The optical coupler of claim 1, wherein the plurality of tunable phase shifters include at least one of an electro-optical induced index modulator, thermal-optics induced index modulator, an image-spot modulator, or opto-electro-mechanical modulator.

4. The optical coupler of claim 1, wherein the optical coupler is a 2×2 unitary directional optical coupler and further includes an optical splitter and optical combiner integrated along the path to respectively split or combine the first input optical signal and/or the second input optical signal.

5. The optical coupler of claim 1, wherein the first optical waveguide and the second optical waveguide include respective first and second tunable phase shifters located along a substantially parallel path.

6. The optical coupler of claim 5, wherein the optical coupler comprises a 2×2 unitary directional optical coupler and the first optical waveguide and the second optical waveguide form a respective first arm and a second arm that diverge at a first end and a second end and converge along a middle portion of the substantially parallel path, and wherein the first and second tunable phase shifters are located at the middle portion.

7. The optical coupler of claim 1, wherein the plurality of phase shifters include at least one of a common phase shifter and a differential phase shifter.

8. The optical coupler of claim 1, wherein the optical coupler comprises a 2×2 unitary directional optical coupler and includes an adiabatic directional coupler having a first optical waveguide that has a different width from the second optical waveguide.

9. The optical coupler of claim 1, wherein the optical coupler is an MMI coupler and the path runs through a multi-mode waveguide structure to form a 2×2 optical coupler.

10. The optical coupler of claim 1, wherein a change in tuning of one or more of the plurality of tunable phase shifters changes an amount that the first input optical signal is output on the first optical waveguide or the second optical waveguide after the transform.

11. The optical coupler of claim 1, wherein changing a tuning of one or more of the plurality of tunable phase shifters changes a weight applied to the first input optical signal during the transform.

12. A method of forming an optical coupler, comprising:
disposing a first optical waveguide alongside a second optical waveguide in a semiconductor layer; and
forming a plurality of tunable phase shifters along a path formed by the first optical waveguide and the second optical waveguide, wherein the first optical waveguide and the second optical waveguide are disposed to run along the path to form a 2×2 unitary matrix that receives a first optical signal at the first optical waveguide and a second optical signal at the second optical waveguide and direct the first optical signal and a second optical signal along the path to output a phase-shifted optical signal from the first optical waveguide and the second optical waveguide.

13. The method of claim 12, wherein forming the plurality of tunable phase shifters includes forming a first phase shifter on the first optical waveguide and forming a second phase shifter on the second optical waveguide.

14. The method of claim 13, wherein forming the plurality of tunable phase shifters includes forming a plurality of phase shifters in succession across the first and the second optical waveguide.

15. The method of claim 13, wherein forming the plurality of tunable phase shifters includes forming a plurality of phase shifters including at least one of a thermal-based phase shifter and a PN-diode-based phase shifter.

16. The method of claim 12, wherein disposing the first optical waveguide alongside the second optical waveguide comprises disposing the first optical waveguide and the second optical waveguide in the semiconductor layer to include a gap that runs between the first optical waveguide and the second optical waveguide along a substantially parallel path.

17. The method of claim 16, wherein the optical coupler is a 2×2 unitary directional optical coupler and the gap comprises a distance to promote evanescent coupling between the first optical waveguide and the second optical waveguide.

18. An optical unitary matrix multiplier, comprising:
a plurality of 2×2 unitary optical matrices optically coupled to receive an array of optical signal inputs and to linearly transform the plurality of optical signal inputs into an array of optical signal outputs, wherein each of the plurality of 2×2 unitary optical matrices include a first optical waveguide and a second optical waveguide coupled to converge and diverge along an optical path; and
a plurality of tunable optical phase shifters included along the optical path of each of the first optical waveguide and the second optical waveguide in each of the plurality of 2×2 unitary optical matrices to phase shift an optical beam to linearly transform the array of optical signal inputs into the array of optical signal outputs.

19. The optical unitary matrix multiplier of claim 18, wherein the plurality of 2×2 unitary optical matrices are coupled to split, combine, and phase shift one or more optical signals received by each of the plurality of 2×2 unitary optical matrices.

20. The optical unitary matrix multiplier of claim 18, wherein n is 2, 4, 8, 16, 32, 64, 128, or 256.

21. The optical unitary matrix multiplier of claim 18, wherein the array of optical signal inputs includes an array of n optical signal inputs and the array of optical signal outputs includes an array of n optical signal outputs and wherein the optical unitary matrix multiplier includes n(n−1)/2 2×2 unitary optical matrices.

22. The optical unitary matrix multiplier of claim 18, wherein each of the plurality of 2×2 unitary optical matrices is a 2×2 unitary directional optical coupler or a 2×2 unitary multi-mode interference (MMI) optical coupler.

* * * * *